United States Patent
Carpenter, Jr.

(10) Patent No.: US 12,137,627 B1
(45) Date of Patent: Nov. 12, 2024

(54) ADJUSTABLE DEFLECTOR ASSEMBLY FOR A BROADCAST SPREADER

(71) Applicant: Brinly-Hardy Company, Jeffersonville, IN (US)

(72) Inventor: Scott Lee Carpenter, Jr., Charlestown, IN (US)

(73) Assignee: Brinly-Hardy Company, Jeffersonville, IN (US)

( * ) Notice: Subject to any disclaimer, the term of this patent is extended or adjusted under 35 U.S.C. 154(b) by 414 days.

(21) Appl. No.: 17/574,882

(22) Filed: Jan. 13, 2022

(51) Int. Cl.
*A01C 17/00* (2006.01)

(52) U.S. Cl.
CPC .......... *A01C 17/008* (2013.01); *A01C 17/001* (2013.01)

(58) Field of Classification Search
CPC ..... A01C 15/008; A01C 15/12; A01C 15/124; A01C 17/001; Y10T 403/32451; Y10T 403/32426; Y10T 403/7079; Y10T 403/32434; Y10T 403/7117; Y10T 403/7088; E01C 19/203; B60B 39/04
See application file for complete search history.

(56) References Cited

U.S. PATENT DOCUMENTS

| | | | | |
|---|---|---|---|---|
| 2,609,582 A * | 9/1952 | Kindorf | ...................... | E04B 9/18 403/387 |
| 2,928,512 A * | 3/1960 | Slater | ..................... | F16B 37/045 403/22 |
| 3,469,870 A * | 9/1969 | Barkus | ..................... | E04G 25/06 108/150 |
| 3,790,090 A * | 2/1974 | Lorenc | ..................... | B60P 1/38 239/666 |
| 5,273,211 A * | 12/1993 | Pierce | .................. | A01C 15/006 366/186 |
| 5,370,321 A * | 12/1994 | Bianco | ................. | A01C 15/008 239/685 |
| 5,588,766 A * | 12/1996 | Lai | .......................... | F16B 7/105 403/107 |
| 5,951,107 A * | 9/1999 | Tornero | ................. | A47C 7/402 403/105 |
| 6,138,927 A * | 10/2000 | Spear | ..................... | A01C 15/02 239/666 |
| 6,616,074 B2 * | 9/2003 | Courtney | ............. | A01C 15/008 239/685 |
| 7,306,175 B1 * | 12/2007 | Farmer | ................. | E01C 19/203 239/650 |
| 7,798,428 B1 * | 9/2010 | Weil | ...................... | B05B 7/2448 239/420 |
| 8,074,904 B1 * | 12/2011 | Hobbs | .................. | A01C 17/006 239/668 |

(Continued)

*Primary Examiner* — Joseph A Greenlund
(74) *Attorney, Agent, or Firm* — Stites & Harbison, PLLC; David W. Nagle, Jr.

(57) ABSTRACT

An adjustable deflector assembly for a broadcast spreader comprises: a first bracket secured to a support frame of the broadcast spreader on one side of a rotating fan of the broadcast spreader; a second bracket secured to the support frame of the broadcast spreader on another side of the rotating fan of the broadcast spreader; and a deflector mounted to the first bracket and the second bracket. The deflector is configured to be mounted at one of multiple discrete positions on each of the first bracket and the second bracket, such that a spread width of material distributed by the rotating fan is increased or decreased depending on which of the multiple discrete positions is selected.

9 Claims, 9 Drawing Sheets

(56) References Cited

U.S. PATENT DOCUMENTS

| | | | | |
|---|---|---|---|---|
| 8,456,831 B1* | 6/2013 | Pang | ................ | G06F 1/187 |
| | | | | 248/221.11 |
| 8,474,735 B2* | 7/2013 | Hobbs, Jr. | ............ | A01C 17/006 |
| | | | | 239/685 |
| 9,243,944 B2* | 1/2016 | Floyd | ................ | E03B 9/08 |
| 2010/0200680 A1* | 8/2010 | Hobbs, Jr. | ............ | A01C 15/006 |
| | | | | 239/687 |
| 2014/0262382 A1* | 9/2014 | Schaffert | ............ | A01C 5/064 |
| | | | | 172/558 |

* cited by examiner

ADJUSTABLE DEFLECTOR ASSEMBLY FOR A BROADCAST SPREADER

BACKGROUND OF THE INVENTION

A broadcast spreader (which may also be referred to as a rotary spreader or a spin spreader) is commonly used to distribute granular materials, such as fertilizers, pelletized lime, insecticides, salts, ice melts and/or mulch to a lawn, field, pasture, paved surface, or other outdoor surface. A broadcast spreader is generally comprised of a hopper that holds the granular material. The hopper may be mounted on a frame with wheels and provided with a handle so that it can be pushed. The hopper may also be mounted or otherwise connected to a tractor, truck, riding mower, all-terrain vehicle (ATV), zero-turn radius mower (ZTR), or other vehicle. In this regard, the hopper may be supported on a frame with wheels and towed behind a vehicle, or it may be mounted directly to the vehicle. Whether pushed, towed behind a vehicle, or mounted to a vehicle, the broadcast spreader distributes granular material to a lawn, field, pasture, paved surface, or other outdoor surfaces.

In this regard, the hopper has a discharge port (or opening) in a lower portion thereof, with the granular material passing through this discharge port under the force of gravity, where the material is then distributed onto a rotating fan which propels the material onto the lawn, field, paved surface, or other outdoor surface. The flow of material, i.e., the amount distributed onto the rotating fan, is commonly controlled by a gate (or shutter)). The gate can be selectively positioned relative to the discharge port to regulate the flow of material. In other words, the gate may be moved to allow a greater or lesser amount of material to pass through the discharge port. In any event, such a construction for a broadcast spreader is well-known and understood by one of ordinary skill in the art. For example, U.S. Pat. No. 6,616,074, which is incorporated herein by reference, identifies multiple prior art references that describe the construction of a common broadcast spreader. For other examples, reference is made to U.S. Pat. No. 8,474,735 entitled "Broadcast Spreader" and U.S. Pat. No. 8,074,904 entitled "Broadcast Spreader with a Directional Control Assembly," each of which is assigned to the assignee of the present application and are also incorporated herein by reference.

However, it is recognized that there are scenarios in which the distance that material is cast from the spreader (which may also be referred to as the "width of the spread pattern" or the "spread width") is too large. The material being cast may pose harm to turf, landscaping, or water sources, or may be wastefully cast onto an undesirable surface. Manufacturers of spreaders have sought to address this problem by adding a component to their spreaders which reduces the spread width. These components (often referred to as "deflectors") are struck by the cast material, deflecting the trajectory of the material, such that a desired spread width is achieved. Although these deflectors do limit the spread width of the material, they do not allow for multiple spread widths, or, if they do, tools are required to modify the deflectors to adjust the spread width. Because of this, a user must either purchase multiple deflectors to achieve multiple reduced spread widths, or they must bring tools to their job site in order to modify the deflector. Another problem with modern deflectors is that they must be removed from the spreader, requiring the use of tools, when not in use. This creates the opportunity for part of the spreader, such as the mounting hardware, or the entire spreader to be lost in storage.

SUMMARY OF THE INVENTION

The present invention is an adjustable deflector assembly for a broadcast spreader, which allows a user to control the spread pattern without requiring any removal or replacement of the deflector assembly.

The adjustable deflector assembly generally includes: a first bracket and a second bracket, which are secured to a support frame of the broadcast spreader, on either side of a rotating fan of the broadcast spreader; and a deflector which is mounted to the first bracket and the second bracket. The deflector is configured to be mounted at one of multiple discrete positions on each of the first bracket and the second bracket, such that the spread width of material distributed by the rotating fan is increased or decreased depending on which of the multiple discrete positions is selected.

In some embodiments, the first bracket defines and includes two openings, each of which can be characterized as including a vertical slot and multiple discrete horizontal slots, which are interconnected by the vertical slot. Similarly, the second bracket defines and includes two openings, each of which can be characterized as including a vertical slot and multiple discrete horizontal slots, which are interconnected by the vertical slot. There is a first pair of bolts (which also may be characterized and referred to as "mounting pegs"), with each bolt extending outwardly from an exterior surface of the deflector. Similarly, there is also a second pair of bolts (or mounting pegs), with each bolt extending outwardly from the exterior surface of the deflector. The bolts of the first pair of bolts (or mounting pegs) each extend through one of the openings defined by the first bracket and through the deflector, where they are secured by respective nuts. Similarly, the bolts of the second pair of bolts (or mounting pegs) each extend through one of the openings defined by the second bracket and through the deflector, where they are secured by respective nuts.

In some embodiments, a first end of a first spring is connected to one of the bolts of the first pair of bolts, with a second end of the spring connected to a portion of the first bracket. The force applied by the spring biases the bolt (or mounting peg) into a selected one of the multiple discrete horizontal slots of the first bracket. A first end of a second spring is connected to one of the bolts of the second pair of bolts, with a second end of the spring connected to a portion of the second bracket. The force applied by the spring biases the bolt (or mounting peg) into a selected one of the multiple discrete horizontal slots of the second bracket.

In a storage position, the deflector is positioned above the fan of the broadcast spreader and has no impact at all on the spread pattern. In the storage position, the bolts of the first pair of bolts are received in the uppermost horizontal slots defined by the first bracket. Similarly, the bolts of the second pair of bolts are received in the uppermost horizontal slots defined by the second bracket. The first and second springs bias the respective bolts rearward in the horizontal slots, effectively "locking" the bolts in the horizontal slots.

To move the deflector into a position to control the spread pattern, a user can pull the deflector forward, overcoming the biasing force of the first and second springs, moving the bolts forward in the horizontal slots and to the respective vertical slots of the openings. The user can then manipulate the deflector and the bolts downward into a deployed position, engaging a selected set of horizontal slots. Then, once the user releases the deflector, the springs will again bias the respective bolts rearward in the selected set of horizontal slots The width of the spread pattern changes as the vertical positon of the deflector changes relative to the first and second brackets.

DETAILED DESCRIPTION OF THE INVENTION

Figure 1:
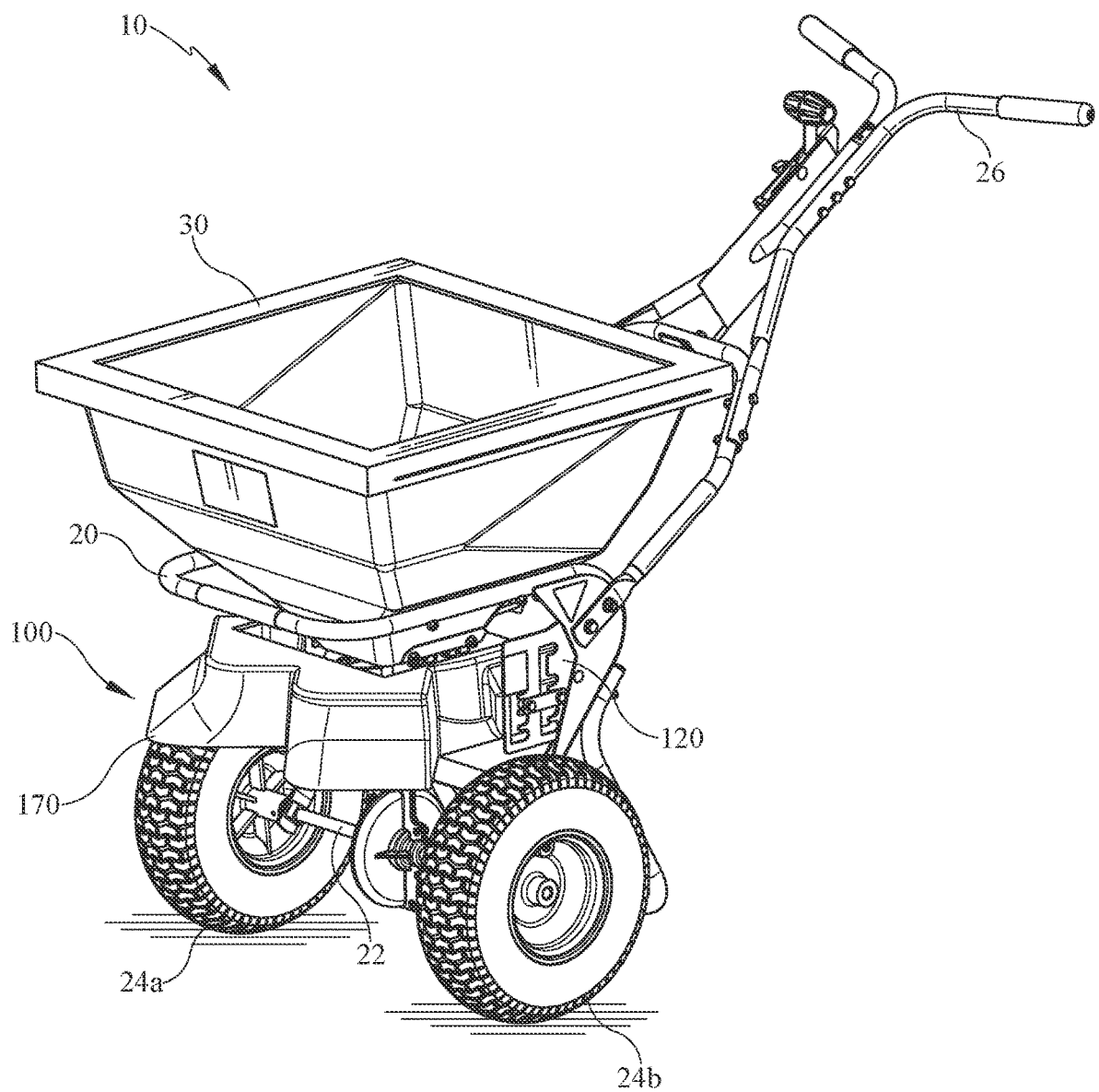
FIG. 1 is a perspective view of a broadcast spreader, including an exemplary adjustable deflector assembly made in accordance with the present invention.
Figure 2:
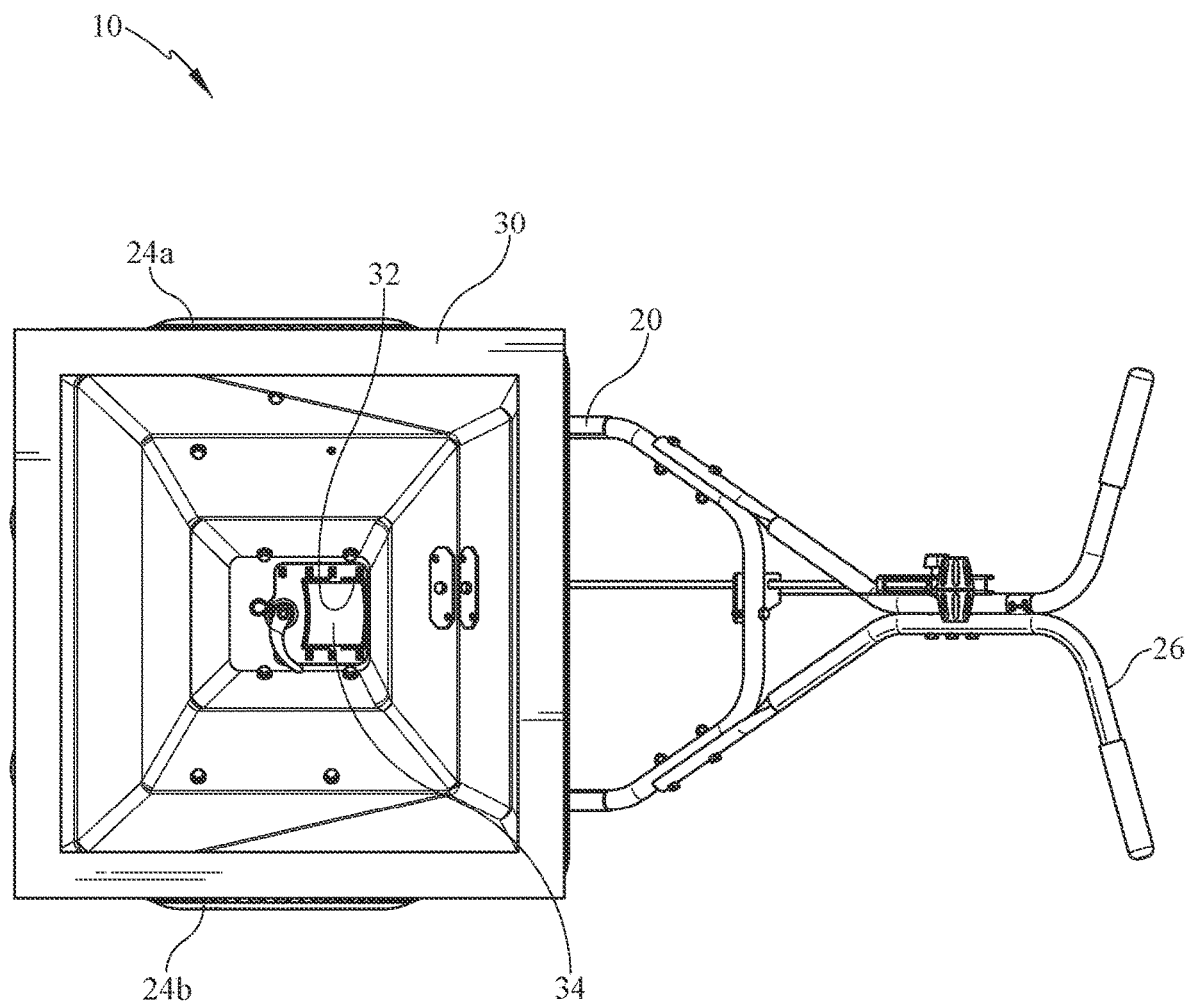
FIG. 2 is a top view of the broadcast spreader of FIG. 1

The present invention is an adjustable deflector assembly for a broadcast spreader.

Referring now to FIGS. 1, 2, 3, and 3A, a broadcast spreader 10 generally includes a hopper 30 that is mounted on a support frame 20. An axle 22 extends through a lower portion of the support frame 20, with wheels 24a, 24b being mounted on either end of the axle 22. In this example, the broadcast spreader 10 further includes a handle 26 that is connected to and extends from the support frame 20, so that the broadcast spreader 10 can be manually pushed over a surface. Like most broadcast spreaders, the broadcast spreader 10 also includes a discharge port (or opening) 32 defined through a bottom surface of the hopper 30, with the granular material stored in the hopper 30 passing through this discharge port 32 under the force of gravity and then being distributed onto a rotating fan (or spinner) 40 which propels the material onto a lawn, field, pasture, paved surface, or other outdoor surface. With respect to the term "granular material," this term is intended to be a generic descriptor of the types of materials that can be distributed using a broadcast spreader, and the term "granular material" includes, but is not limited to, seed, fertilizers, pelletized lime, insecticides, salts, ice melts, and/or mulch. With respect to the discharge port 32, it should also be recognized that the discharge port 32 could be comprised of multiple discrete openings defined through the bottom surface of the hopper 30 without departing from the spirit and scope of the present invention.

Referring still to FIGS. 1, 2, 3, and 3A, in this exemplary embodiment, the flow of material, i.e., the amount distributed onto the rotating fan 40, is controlled by a gate (or shutter) 34. The gate 34 can be selectively positioned relative to the discharge port 32 to regulate the flow of material. Such a construction for a broadcast spreader is well-known and understood by one of ordinary skill in the art. Furthermore, such gate assemblies are described in commonly assigned U.S. Pat. Nos. 8,074,904 and 8,474,735, which have been incorporated herein by reference.

Referring still to FIGS. 1, 2, 3, and 3A, in this exemplary embodiment, the broadcast spreader 10 utilizes the movement of the wheels 24a, 24b to drive the rotating fan 40. Specifically, rotation of the fan 40 is achieved through use of a transmission that couples the axle 22 (to which the wheels 24a, 24b are secured) of the broadcast spreader 10 to a shaft that drives the fan 40. Such construction and use of such a transmission is also well-known and understood by one of ordinary skill in the art. Furthermore, such a transmission is described in commonly assigned U.S. Pat. No. 8,074,90, which again has been incorporated herein by reference.

Referring now to FIGS. 3, 3A, 4, and 4A, an exemplary adjustable deflector assembly 100 is incorporated into the broadcast spreader 10, allowing a user to control the spread pattern without requiring any removal or replacement of the deflector assembly 100. Rather, the deflector assembly 100 can be placed at multiple discrete positions relative to the fan 40, as further described below.

Referring now to FIGS. 3, 3A, 4, 4A, and 5, in this exemplary embodiment, the adjustable deflector assembly 100 includes: a first bracket 110 and a second bracket 120, which are secured to the support frame 20 of the broadcast spreader 10, on either side of the fan 40; and a deflector 170 which is mounted to the first bracket 110 and the second bracket 120.

Figure 4:
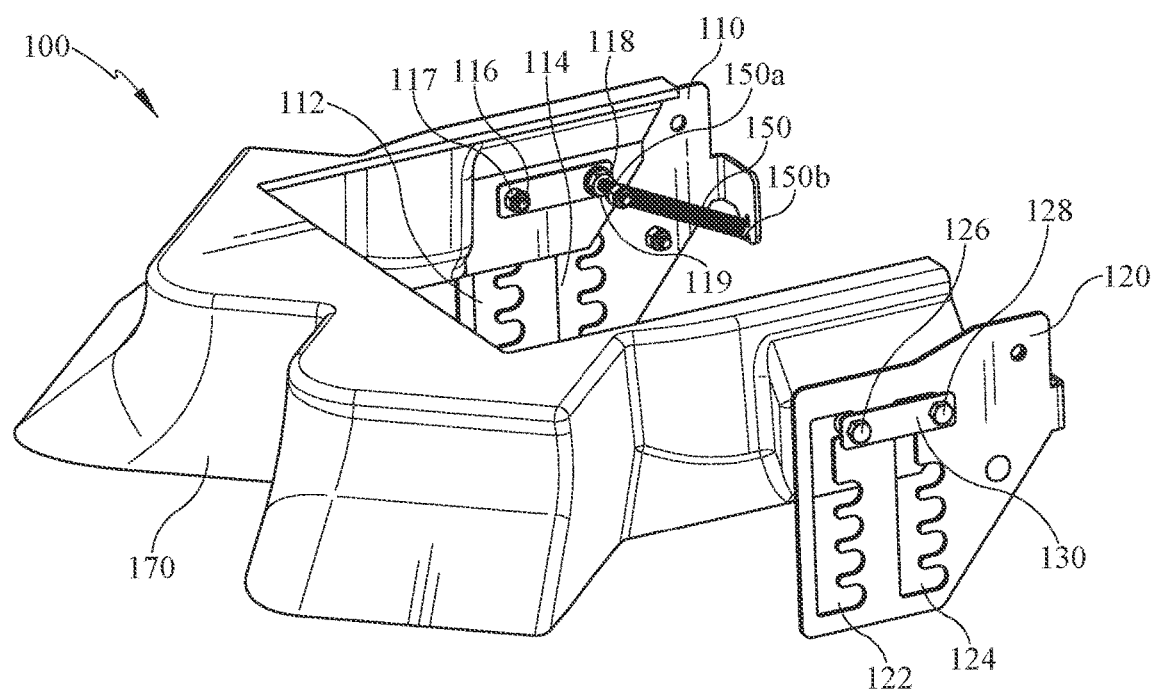
FIG. 4 is a perspective view of the exemplary adjustable deflector assembly in isolation, with the components of the adjustable deflector assembly positioned as they would be when the adjustable deflector assembly is in a storage position.
Figure 4A:
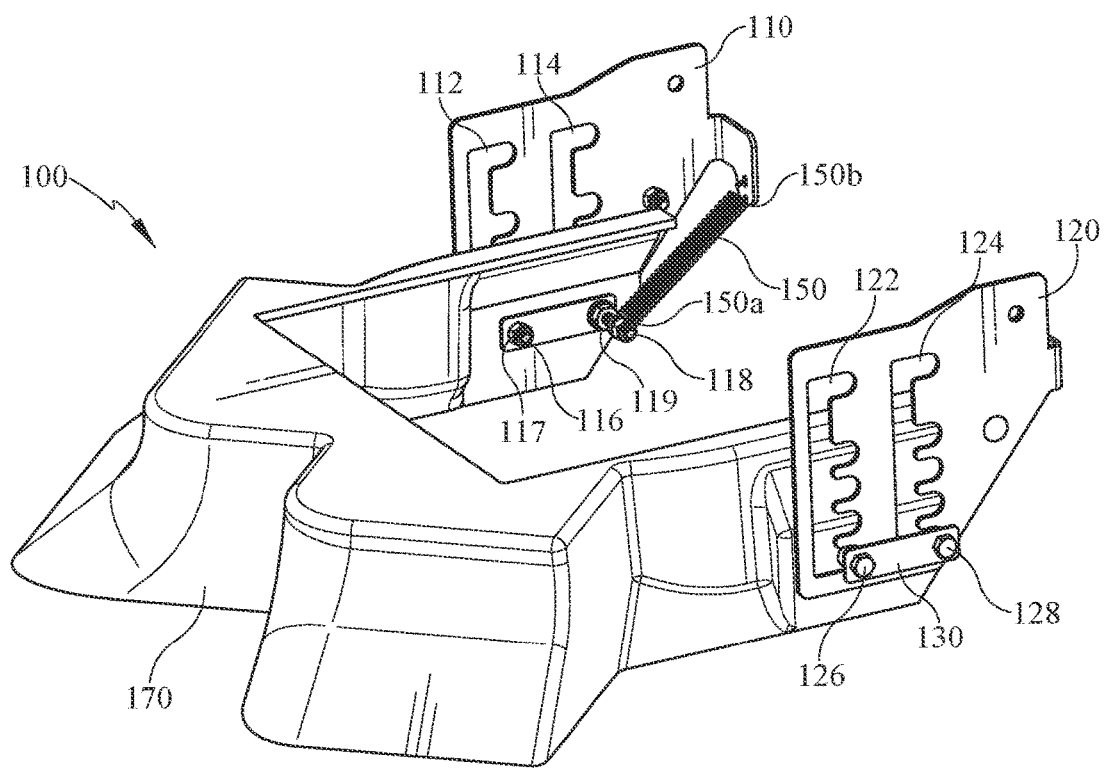
FIG. 4A is a perspective view of the exemplary adjustable deflector assembly similar to FIG. 4, but with the components of the adjustable deflector assembly positioned as they would be when the adjustable deflector assembly is in a deployed position.
Figure 5:
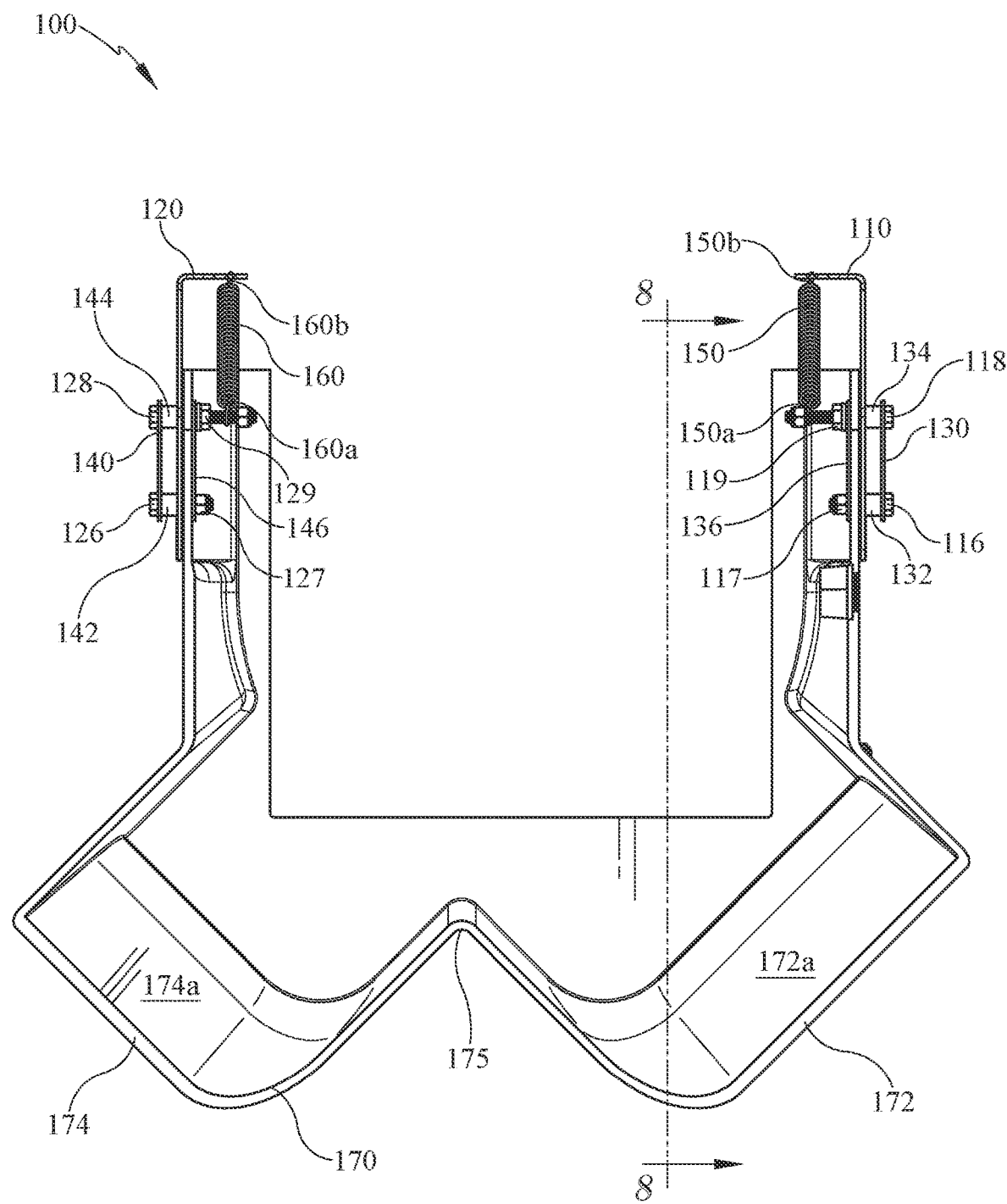
FIG. 5 is a bottom view of the exemplary adjustable deflector assembly of FIGS. 3 and 4.
Figure 6:
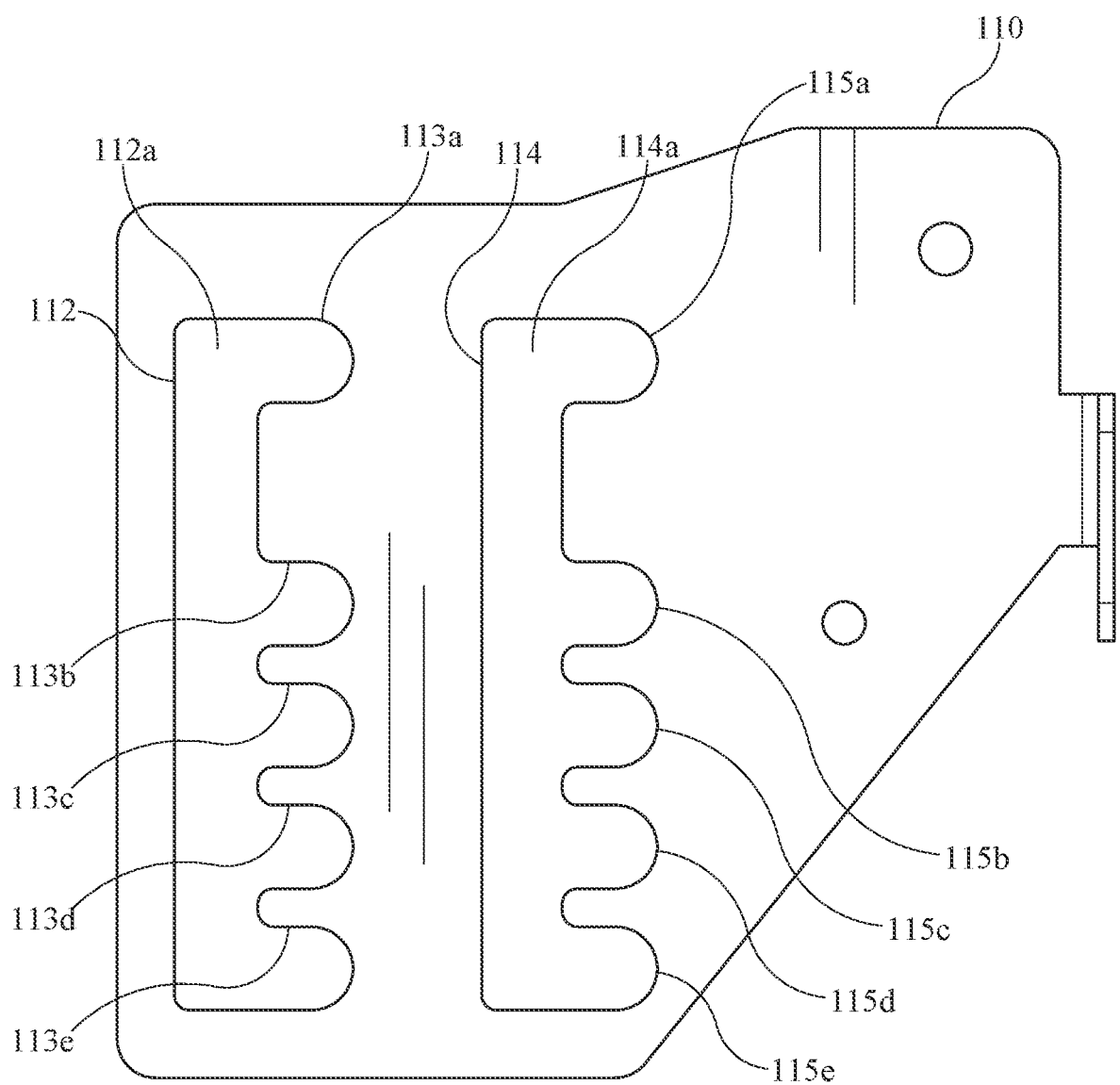
FIG. 6 is an enlarged side view of the first bracket of the exemplary adjustable deflector assembly in isolation.
Figure 7:
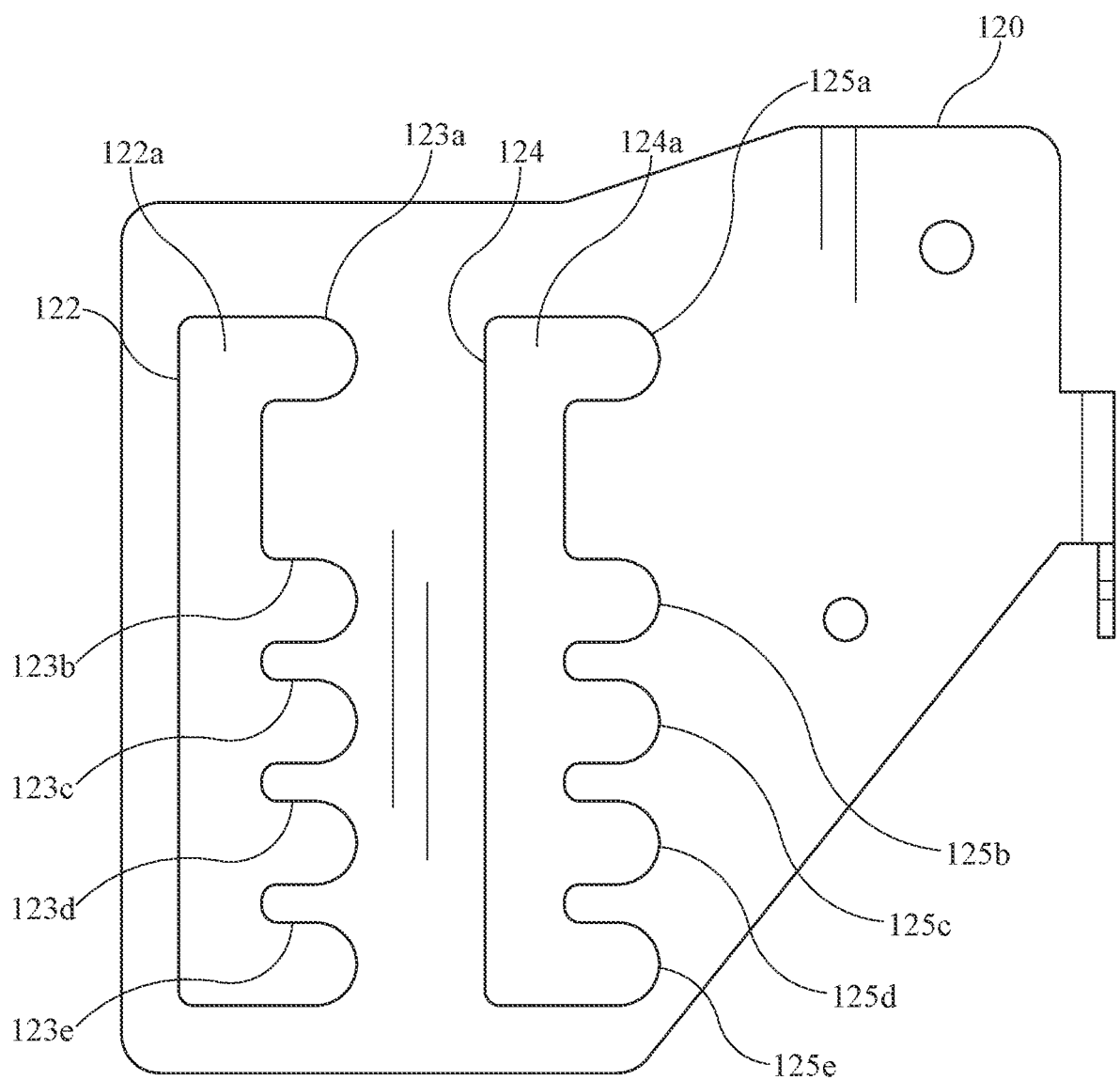
FIG. 7 is an enlarged side view of the first bracket of the exemplary adjustable deflector assembly in isolation.

Referring still to FIGS. 3, 3A, 4, 4A, and 5, along with FIGS. 6 and 7, in this exemplary embodiment, the first bracket 110 defines and includes two openings 112, 114, each of which can be characterized as including: a vertical slot 112a, 114a; and multiple discrete horizontal slots 113a-e, 115a-e, which are interconnected by the respective vertical slot 112a, 114a. Similarly, the second bracket 120 defines and includes two openings 122, 124, each of which can be characterized as including: a vertical slot 122a, 124a; and multiple discrete horizontal slots 123a-e, 125a-e, which are interconnected by the respective vertical slot 122a, 124a.

Referring again to FIGS. 3, 3A, 4, 4A, and 5, in this exemplary embodiment, there is a first pair of bolts (which also may be characterized and referred to as "mounting pegs") 116, 118, with each bolt 116, 118 extending outwardly from an exterior surface of the deflector 170. Similarly, there is also a second pair of bolts (or mounting pegs) 126, 128, with each bolt 126, 128 extending outwardly from the exterior surface of the deflector 170 opposite the first pair of bolts 116, 118.

As best shown in FIGS. 4, 4A, and 5, each bolt 116, 118 of the first pair of bolts (or mounting pegs) extends through one of the openings 112, 114 defined by the first bracket 110 and through the deflector 170, where they are secured by respective nuts 117, 119. Furthermore, in this exemplary embodiment, the bolts 116, 118 first pass through a plate 130 on an exterior surface of the first bracket 110. Each bolt 116, 118 then passes through a respective spacer 132, 134, and such spacers 132, 134 are sized to engage the slots of the respective openings 112, 114, as further described below. In this exemplary embodiment, the bolts 116, 118 then also pass through a plate 136 on an interior surface of the deflector 170 before they are secured with the nuts 117, 119. Thus, the bolts 116, 118, the exterior plate 130, the spacers 132, 134, and the interior plate 136 effectively form a first subassembly that moves together, as further described below.

Similarly, and referring still to FIGS. 4, 4A, and 5, each bolt 126, 128 of the second pair of bolts (or mounting pegs) 126, 128 extends through one of the openings 122, 124 defined by the second bracket 120 and through the deflector 170, where they are secured by respective nuts 127, 129. Furthermore, in this exemplary embodiment, the bolts 126, 128 first pass through a plate 140 on an exterior surface of the second bracket 120. Each bolt 126, 128 then passes through a respective spacer 142, 144, and such spacers 142, 144 are sized to engage the slots of the respective openings 122, 124, as further described below. In this exemplary embodiment, the bolts 126, 128 then also pass through a plate 146 on an interior surface of the deflector 170 before they are secured with the nuts 127, 129. Thus, the bolts 126, 128, the exterior plate 140, the spacers 142, 144, and the interior plate 146 effectively form a second subassembly that moves together, as further described below.

Referring still to FIGS. 4, 4A, and 5, in this exemplary embodiment, the second (or rearmost) bolt 118 is longer than the other bolt 116. A first end 150*a* of a spring 150 is connected to the bolt 118, with a second end 150*b* of the spring 150 connected to a portion of the first bracket 110. The force applied by the spring 150 effectively biases the first subassembly of the bolts 116, 118, the exterior plate 130, the spacers 132, 134, and the interior plate 136 rearward, the importance of which is further described below.

As best shown in FIG. 5, in this exemplary embodiment, the second (or rearmost) bolt 128 is longer than the other bolt 126. A first end 160*a* of a spring 160 is connected to the bolt 128, with a second end 160*b* of the spring 160 connected to a portion of the second bracket 120. The force applied by the spring 160 effectively biases the second subassembly of the bolts 126, 128, the exterior plate 140, the spacers 142, 144, and the interior plate 146 rearward, the importance of which is further described below.

Figure 3:
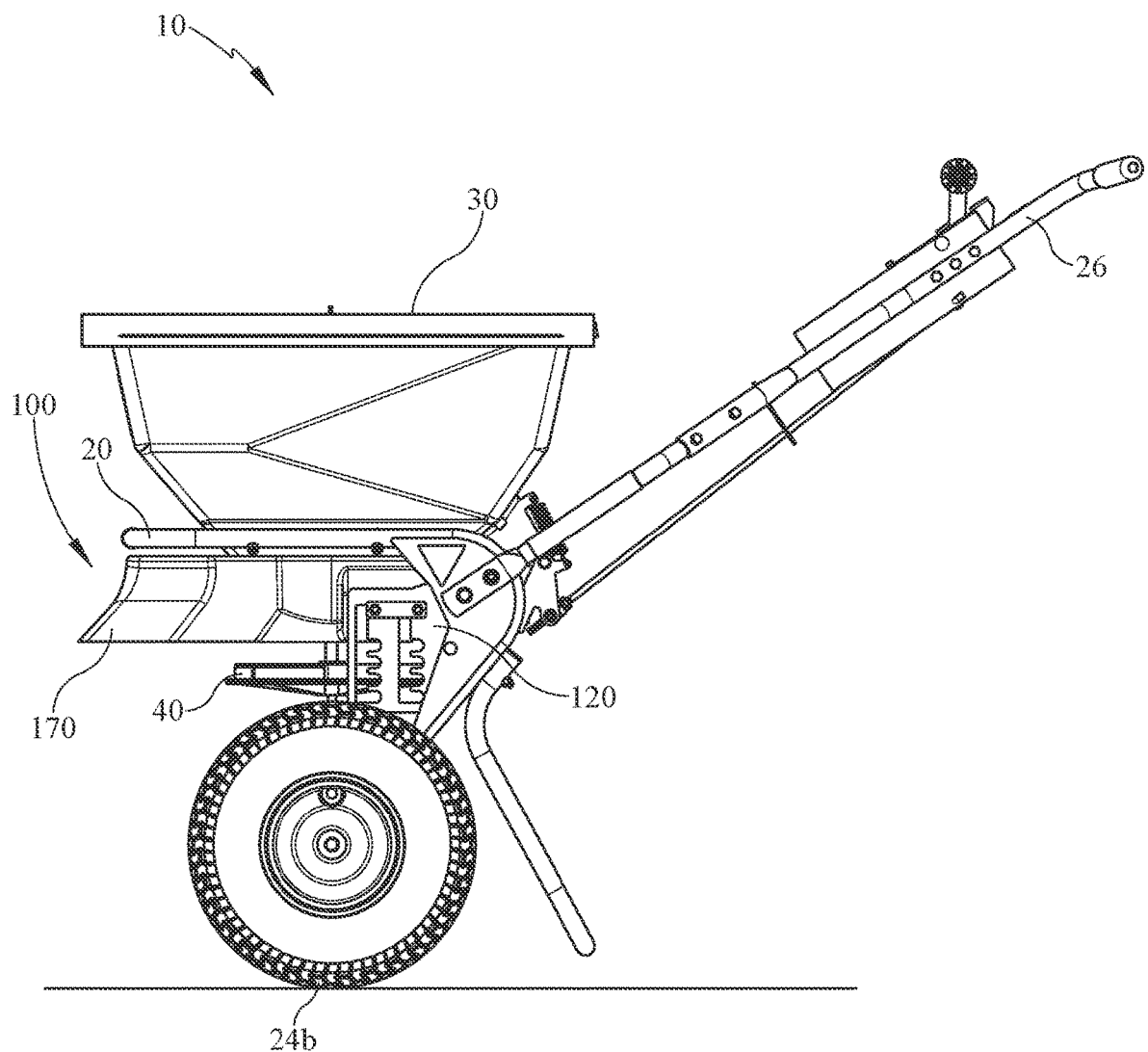
FIG. 3 is a side view of the broadcast spreader of FIG. 1, with the adjustable deflector assembly in a storage position.

Referring now to FIGS. 3 and 4, in a storage position, the deflector 170 is positioned above the fan 40 and has no impact at all on the spread pattern. In the storage position, the bolts 116, 118 are received in the uppermost horizontal slots 113*a*, 115*a* defined by the first bracket 110. Similarly, the bolts 126, 128 are received in the uppermost horizontal slots 123*a*, 125*a* defined by the second bracket 120. The springs 150, 160 bias the respective bolts 116, 118, 126, 128 rearward in the horizontal slots 113*a*, 115*a*, 123*a*, 125*a* (or to the right in FIGS. 3 and 4), effectively "locking" the bolts 116, 118, 126, 128 in the horizontal slots 113*a*, 115*a*, 123*a*, 125*a*. In other words, the first and second subassemblies are a locked position relative to the first and second bracket 110, 120. However, to move the deflector 170 into a position to control the spread pattern, a user can pull the deflector 170 forward, overcoming the biasing force of the springs 150, 160, moving the bolts 116, 118, 126, 128 forward in the horizontal slots 113*a*, 115*a*, 123*a*, 125*a* (or to the left in FIGS. 3 and 4) and to the respective vertical slots 112*a*, 114*a*, 122*a*, 124*a* of the openings 112, 114, 122, 124. The user can then manipulate the deflector 170 and the bolts 116, 118, 126, 128 downward into a deployed position, engaging a selected set of horizontal slots 113*b-e*, 115*b-e*, 123*b-e*, 125*b-e*. Then, once the user releases the deflector 170, the springs 150, 160 will again bias the respective bolts 116, 118, 126, 128 rearward in the selected set of horizontal slots 113*b-e*, 115*b-e*, 123*b-e*, 125*b-e*.

Referring again to FIGS. 4 and 4A, in this exemplary embodiment, aside from the storage position, in which the bolts 116, 118, 126, 128 are received in the uppermost horizontal slots 113*a*, 115*a* defined by the first bracket 110 and the second bracket 120, there are four other discrete positions defined by the horizontal slots 113*b-e*, 115*b-e*, 123*b-e*, 125*b-e*. Thus, the deflector 170 can be placed at four discrete positions relative to the fan 40 to control the spread pattern.

Figure 3A:
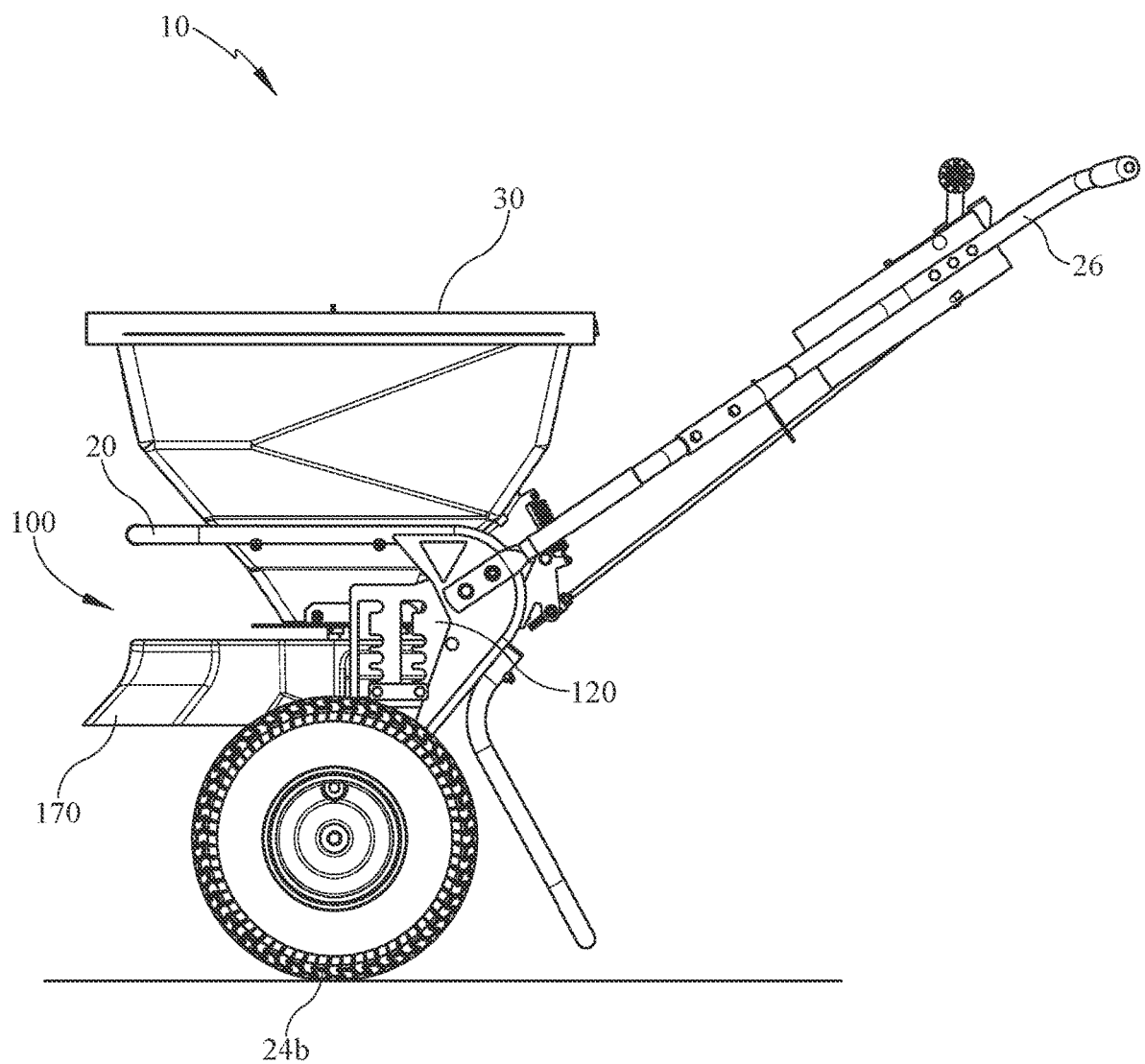
FIG. 3A is a side view of the broadcast spreader similar to FIG. 3, but with the adjustable deflector assembly in a deployed position.
Figure 8:
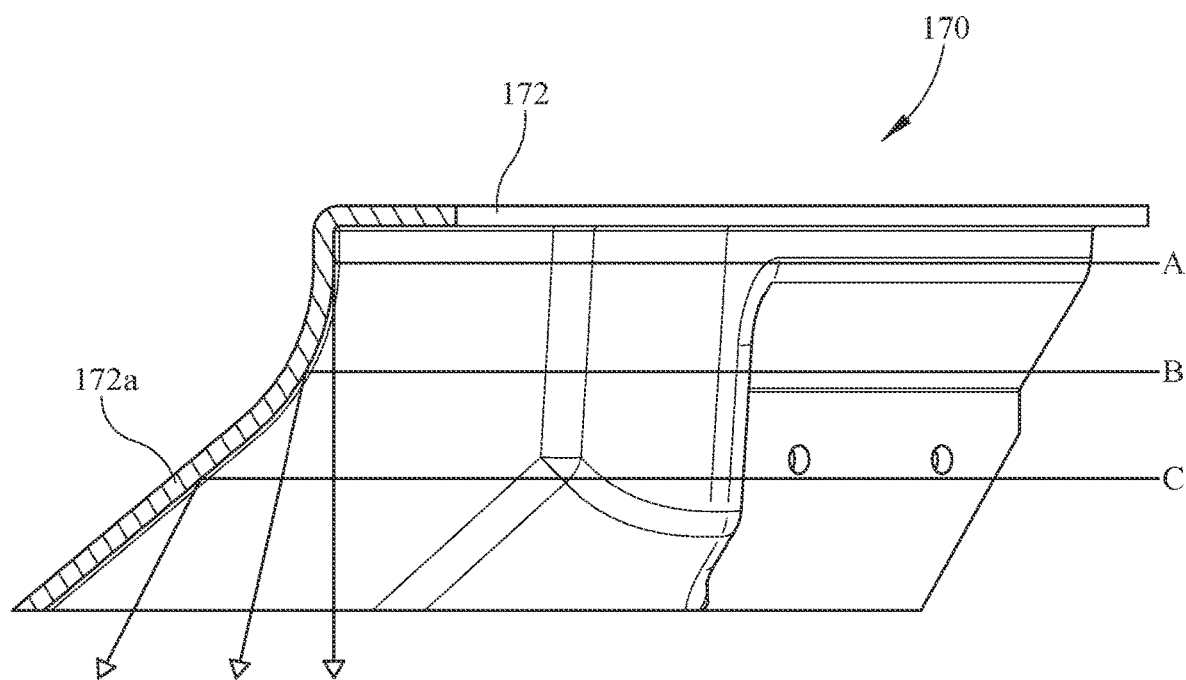
FIG. 8 is a partial sectional view of the deflector of the exemplary adjustable deflector assembly taken along line 8-8 of FIG. 5

Referring now to FIGS. 4, 4A, and 5, along with the partial sectional view of the deflector 170 in FIG. 8, in this exemplary embodiment, the deflector 170 effectively defines two chutes 172, 174 that are separated by a notch 175. Each of these chutes 172, 174 defines a pathway for materials propelled from the fan 40, directing the material onto the underlying lawn, field, paved surface, or other outdoor surface. Each of these chutes 172, 174 has a sloped front wall 172*a*, 174*a*. Thus, as best shown in FIG. 8, when material is propelled from the fan 40, it strikes the sloped wall 172*a* of the first chute 172. Because of the sloping of the wall 172*a*, the incident angle of material striking the wall 172*a* changes as the deflector 170 is repositioned vertically with respect to the fan 40, as indicated by lines A, B, and C in FIG. 8. Of course, the second chute 174 functions in the same manner. As a result, the width of the spread pattern changes as the vertical positon of the deflector 170 changes relative to the first and second brackets 110, 120. As described above with reference to FIGS. 3 and 4, in a storage position, the deflector 170 is positioned above the fan 40 and has no impact at all on the spread pattern. However, as the deflector is move downward relative to the first and second brackets 110, 120, the width of the spread pattern is decreased, with a minimum width when the deflector is in the lowermost horizontal slots 113*e*, 115*e* defined by the first bracket 110 and the second bracket 120, as shown in FIGS. 3A and 4A (where the material is moving along line A within the deflector 170).

Referring again to FIG. 8, inclusion of the notch 175 that defines and separates the first chute and the second chute 174 ensures that the material is distributed substantially equally within the width of the spread pattern.

One of ordinary skill in the art will recognize that additional embodiments are also possible without departing from the teachings of the present invention. This detailed description, and particularly the specific details of the exemplary embodiment disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. An adjustable deflector assembly for a broadcast spreader, comprising:
   a first bracket secured to a support frame of the broadcast spreader on one side of a rotating fan of the broadcast spreader, wherein the first bracket defines and includes two openings, each of which can be characterized as including a vertical slot and multiple discrete horizontal slots which are interconnected by the vertical slot;
   a second bracket secured to the support frame of the broadcast spreader on another side of the rotating fan of the broadcast spreader, wherein the second bracket defines and includes two openings, each of which can be characterized as including a vertical slot and multiple discrete horizontal slots which are interconnected by the vertical slot;
a first subassembly, including a first pair of mounting pegs extending outwardly from an exterior surface of the deflector, with each mounting peg of the first pair of mounting pegs engaging one of the two openings defined by the first bracket; and
a second subassembly, including a second pair of mounting pegs extending outwardly from the exterior surface of the deflector, with each mounting peg of the second pair of mounting pegs engaging one of the two openings defined by the second bracket;
wherein the deflector is configured to be mounted at one of multiple discrete positions on each of the first bracket and the second bracket, such that a spread width of material distributed by the rotating fan is increased or decreased depending on which of the multiple discrete positions is selected; and
wherein the multiple discrete horizontal slots of the first bracket and the second bracket define the multiple discrete positions at which the deflector can be mounted.

2. The adjustable deflector assembly as recited in claim 1, and further comprising:
a first spring connected to one of the mounting pegs of the first pair of mounting pegs, which biases the mounting peg into a selected one of the multiple discrete horizontal slots of the first bracket; and
a second spring connected to one of the mounting pegs of the first pair of mounting pegs, which biases the mounting peg into a selected one of the multiple discrete horizontal slots of the second bracket.

3. The adjustable deflector assembly as recited in claim 1, wherein the deflector defines two chutes that are separated by a notch.

4. The adjustable deflector assembly as recited in claim 3, wherein each of the two chutes includes a sloped front wall.

5. The adjustable deflector assembly as recited in claim 1, wherein the first subassembly further includes at least one plate that operably connects each mounting peg of the first pair of mounting pegs, so that the mounting pegs move together relative to the first bracket; and
wherein the second sub assembly further includes at least one plate that operably connects each mounting peg of the second pair of mounting pegs, so that the mounting pegs move together relative to the second bracket.

6. An adjustable deflector assembly for a broadcast spreader, comprising:
a first bracket secured to a support frame of the broadcast spreader on one side of a rotating fan of the broadcast spreader, wherein the first bracket defines and includes two openings, each of which can be characterized as including a vertical slot and multiple discrete horizontal slots which are interconnected by the vertical slot;
a second bracket secured to the support frame of the broadcast spreader on another side of the rotating fan of the broadcast spreader, wherein the second bracket defines and includes two openings, each of which can be characterized as including a vertical slot and multiple discrete horizontal slots which are interconnected by the vertical slot;
a deflector mounted to the first bracket and the second bracket;
a first subassembly, including a first pair of mounting pegs extending outwardly from an exterior surface of the deflector, with each mounting peg of the first pair of mounting pegs passing through (i) a plate on an exterior surface of the first bracket, (ii) a respective spacer, which engages one of the two openings defined by the first bracket, (iii) a plate on an interior surface of the deflector; and
a second subassembly, including a second pair of mounting pegs extending outwardly from the exterior surface of the deflector, with each mounting peg of the second pair of mounting pegs passing through (i) a plate on an exterior surface of the second bracket, (ii) a respective spacer, which engages one of the two openings defined by the second bracket, (iii) a plate on the interior surface of the deflector;
wherein the multiple discrete horizontal slots of the first bracket and the second bracket define multiple discrete positions at which the deflector can be mounted relative to the rotating fan of the broadcast spreader, such that a spread width of material distributed by the rotating fan is increased or decreased depending on which of the multiple discrete positions is selected.

7. The adjustable deflector assembly as recited in claim 6, and further comprising:
a first spring connected to one of the mounting pegs of the first subassembly, which biases the first subassembly into a locked position relative to the first bracket; and
a second spring connected to one of the mounting pegs of the second subassembly, which biases the second subassembly into a locked position relative to the first bracket.

8. The adjustable deflector assembly as recited in claim 6, wherein the deflector defines two chutes that are separated by a notch.

9. The adjustable deflector assembly as recited in claim 8, wherein each of the two chutes includes a sloped front wall.

* * * * *